US010518587B2

(12) United States Patent
Nishino

(10) Patent No.: US 10,518,587 B2
(45) Date of Patent: *Dec. 31, 2019

(54) PNEUMATIC TIRE

(71) Applicant: The Yokohama Rubber Co., LTD., Minato-ku, Tokyo (JP)

(72) Inventor: Tomohisa Nishino, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 199 days.

This patent is subject to a terminal disclaimer.

(21) Appl. No.: 15/544,870

(22) PCT Filed: Jan. 22, 2016

(86) PCT No.: PCT/JP2016/051898
§ 371 (c)(1),
(2) Date: Jul. 19, 2017

(87) PCT Pub. No.: WO2016/117695
PCT Pub. Date: Jul. 28, 2016

(65) Prior Publication Data
US 2018/0272808 A1 Sep. 27, 2018

(30) Foreign Application Priority Data
Jan. 22, 2015 (JP) .............................. 2015-010590

(51) Int. Cl.
*B60C 11/03* (2006.01)
*B60C 11/12* (2006.01)
(Continued)

(52) U.S. Cl.
CPC ...... *B60C 11/0309* (2013.01); *B60C 11/0306* (2013.01); *B60C 11/11* (2013.01);
(Continued)

(58) Field of Classification Search
CPC ..... B60C 11/1307; B60C 11/03; B60C 11/11; B60C 11/12; B60C 11/1218; B60C 11/1259

See application file for complete search history.

(56) References Cited

U.S. PATENT DOCUMENTS 5,031,680 A * 7/1991 Kajikawa ................ B60C 11/11
152/209.18
6,105,644 A 8/2000 Ikeda
(Continued)

FOREIGN PATENT DOCUMENTS

AU 2011309648 2/2015
CN 101811420 8/2010
(Continued)

OTHER PUBLICATIONS

International Search Report for International Application No. PCT/JP2016/051898 dated Apr. 5, 2016, 2 pages, Japan.

*Primary Examiner* — Robert C Dye
*Assistant Examiner* — Farah Taufiq
(74) *Attorney, Agent, or Firm* — Thorpe North & Western

(57) ABSTRACT

A pneumatic tire comprising a plurality of circumferential main grooves, and a land portion defined by a pair of the plurality of circumferential main grooves. The land portion comprises a plurality of first lug grooves, a plurality of second lug grooves that are wider than the first lug grooves, and a plurality of notch portions formed on only the opening portions of the first lug grooves. A groove width Wg1 of the first lug grooves and a groove width Wg2 of the second lug grooves have the relationship 1.0 mm≤Wg2−Wg1≤4.0 mm.

18 Claims, 10 Drawing Sheets

(51) Int. Cl.
*B60C 11/11* (2006.01)
*B60C 11/13* (2006.01)

(52) U.S. Cl.
CPC ...... *B60C 11/1218* (2013.01); *B60C 11/1236* (2013.01); *B60C 2011/0365* (2013.01); *B60C 2011/0381* (2013.01); *B60C 2011/0388* (2013.01); *B60C 2011/1213* (2013.01); *B60C 2011/133* (2013.01)

(56) References Cited

U.S. PATENT DOCUMENTS

| | | | |
|---|---|---|---|
| 6,601,623 B1 * | 8/2003 | Katayama | B60C 11/12 152/209.15 |
| 2002/0170643 A1 | 11/2002 | Kuze | |
| 2004/0238092 A1 * | 12/2004 | Colombo | B29D 30/0606 152/209.15 |
| 2008/0156405 A1 | 7/2008 | Tanabe | |
| 2009/0320982 A1 * | 12/2009 | Ochi | B60C 11/0306 152/209.25 |
| 2018/0201071 A1 * | 7/2018 | Mishima | B60C 11/0306 |

FOREIGN PATENT DOCUMENTS

| | | | | |
|---|---|---|---|---|
| CN | 103241070 | | 8/2013 | |
| GB | 1549347 | A * | 8/1979 | ......... B60C 11/0309 |
| JP | 02179508 | A * | 7/1990 | ......... B60C 11/0309 |
| JP | 08067111 | A * | 3/1996 | |
| JP | H10-217719 | | 8/1998 | |
| JP | H10-297220 | | 11/1998 | |
| JP | 200-0043511 | | 2/2000 | |
| JP | 2002240513 | A * | 8/2002 | |
| JP | 3894743 | | 3/2007 | |
| JP | 2008-222075 | | 9/2008 | |
| JP | 4316452 | | 8/2009 | |
| JP | 2010208419 | A * | 9/2010 | |
| JP | 4677408 | | 4/2011 | |
| JP | 5165975 | | 3/2013 | |
| JP | 2014-172484 | | 9/2014 | |
| WO | WO 2006/022120 | | 3/2006 | |
| WO | WO 2009/034912 | | 3/2009 | |
| WO | WO 2012/043036 | | 4/2012 | |

* cited by examiner

| | CONVENTIONAL EXAMPLE | COMPARATIVE EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 |
|---|---|---|---|---|---|---|---|---|---|---|---|---|---|
| NOTCH PORTION | NO | NO | YES | YES | YES | YES | YES | YES | YES | YES | YES | YES (PROJECTS IN CIRCUMFERENTIAL DIRECTION) | YES (PROJECTS IN CIRCUMFERENTIAL DIRECTION) |
| Wg2 − Wg1 (mm) | 0 | 2.0 | 2.0 | 3.0 | 1.5 | 1.5 | 1.5 | 1.5 | 1.5 | 1.5 | 1.5 | 1.5 | 1.5 |
| Wg2 (mm) | 3.0 | 4.0 | 4.0 | 4.5 | 4.0 | 4.0 | 4.0 | 4.0 | 4.0 | 4.0 | 4.0 | 4.0 | 4.0 |
| L2/L1 | − | − | 0.25 | 0.25 | 0.25 | 0.35 | 0.55 | 0.55 | 0.55 | 0.55 | 0.55 | 0.55 | 0.55 |
| W2/W1 | − | − | 0.05 | 0.05 | 0.05 | 0.05 | 0.05 | 0.10 | 0.20 | 0.10 | 0.10 | 0.10 | 0.10 |
| D2/D1 | − | − | 1.00 | 1.00 | 1.00 | 1.00 | 1.00 | 1.00 | 1.00 | 0.63 | 0.30 | 0.30 | 1.00 |
| θ (DEGREES) | − | − | 90 | 90 | 90 | 90 | 90 | 90 | 90 | 90 | 90 | 65 | 45 |
| PERFORMANCE ON SNOW | 100 | 100 | 102 | 102 | 103 | 104 | 105 | 107 | 108 | 106 | 105 | 106 | 107 |
| NOISE PERFORMANCE | 100 | 104 | 103 | 104 | 103 | 103 | 103 | 101 | 99 | 102 | 103 | 103 | 104 |
| STEERING STABILITY PERFORMANCE | 100 | 100 | 98 | 98 | 97 | 97 | 97 | 96 | 95 | 97 | 98 | 98 | 99 |

FIG. 10

PNEUMATIC TIRE

TECHNICAL FIELD

The present technology relates to a pneumatic tire and particularly relates to a pneumatic tire with good performance on snow and noise performance in a compatible manner.

BACKGROUND ART

To improve performance on snow, conventional pneumatic tires have been provided with a block pattern to increase traction characteristics. An example of a conventional pneumatic tire that is configured in this manner is the technology described in Japanese Patent No. 4677408B.

However, there is also a demand for the noise performance to be enhanced in pneumatic tires.

SUMMARY

The present technology provides a pneumatic tire with good performance on snow and noise performance in a compatible manner.

A pneumatic tire according to an embodiment of the present technology comprises a plurality of circumferential main grooves; and a land portion defined by a pair of the plurality of circumferential main grooves; the land portion comprising a plurality of first lug grooves, a plurality of second lug grooves wider than the first lug grooves, and a plurality of notch portions formed only on opening portions of the first lug grooves.

In a pneumatic tire according to an embodiment of the present technology, by the narrower first lug grooves and the wider second lug grooves being intermingled in the land portion, the pattern noise when the tire rolls is reduced. This is advantageous because the noise performance of the tire is improved. Additionally, by the notch portions increasing the width of the opening portions of the narrower first lug grooves, the snow discharge properties of the lug grooves are improved. This is advantageous because the performance on snow of the tire is improved.

BRIEF DESCRIPTION OF DRAWINGS

FIG. 10 is a table showing results of performance testing of pneumatic tires according to embodiments of the present technology.

DETAILED DESCRIPTION

Embodiments of the present technology are described in detail below with reference to the drawings. However, the present technology is not limited to these embodiments. Moreover, constituents of the embodiments include elements that are replaceable while maintaining consistency with the technology, and obviously replaceable elements. Furthermore, the modified examples described in the embodiments can be combined as desired within the scope apparent to those skilled in the art.

Pneumatic Tire

Figure 1:
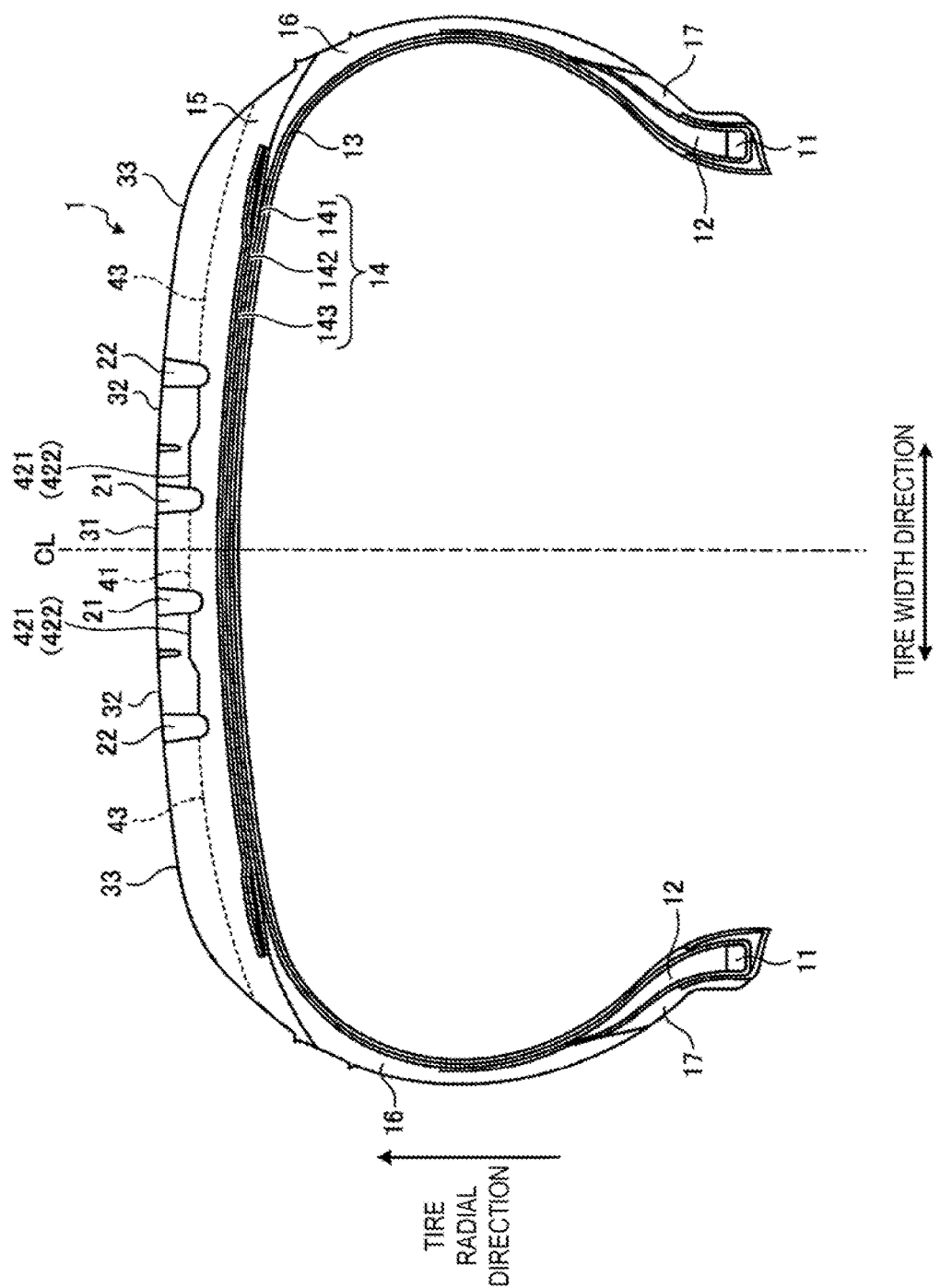
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. The same drawing illustrates a cross-sectional view of a region to one side in the tire radial direction. Also, the same drawing illustrates a radial tire for a passenger vehicle as an example of a pneumatic tire.

In reference to the same drawing, "cross section in a tire meridian direction" refers to a cross-section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire lateral direction" refers to the direction parallel with the tire rotation axis. "Tire radial direction" refers to the direction perpendicular to the tire rotation axis.

The pneumatic tire 1 has an annular structure with the tire rotation axis as a center thereof and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are annular members constituted by a plurality of bead wires bundled together. The pair of bead cores 11, 11 constitute the cores of the left and right bead portions. The pair of bead fillers 12, 12 are disposed on peripheries of the pair of bead cores 11, 11 in the tire radial direction and constitute the bead portions.

The carcass layer 13 has a single-layer structure constituted by one carcass ply or a multi-layer structure constituted by layered carcass plies, and stretches between the left and right bead cores 11, 11 in a toroidal form, forming the framework for the tire. Additionally, both end portions of the carcass layer 13 are turned back outwardly in the tire lateral direction so as to wrap around the bead cores 11 and the bead fillers 12 and fixed. The carcass ply (plies) of the carcass layer 13 is constituted by a plurality of carcass cords formed from steel or an organic fiber material (e.g. aramid, nylon, polyester, rayon, or the like) covered by a coating rubber and subjected to a rolling process. The carcass ply (plies) has a carcass angle (inclination angle of the fiber direction of the carcass cords with respect to the tire circumferential direction), as an absolute value, of from 80 degrees to 95 degrees.

The belt layer 14 is formed by layering a pair of cross belts 141, 142 and a belt cover 143 and is disposed around the periphery of the carcass layer 13. The pair of cross belts 141, 142 are constituted by a plurality of belt cords formed from steel or an organic fiber material covered by coating rubber and subjected to a rolling process. The cross belts 141, 142 have a belt angle, as an absolute value, of from 20 degrees to 55 degrees. Furthermore, the pair of cross belts 141, 142 have belt angles (inclination angle of the fiber direction of the belt cords with respect to the tire circumferential direction) of opposite signs, and the belts are layered so that the fiber directions of the belt cords intersect each other (crossply structure). The belt cover 143 is constituted by a plurality of cords formed from steel or an organic fiber material covered by coating rubber and subjected to a rolling process. The belt cover 143 has a belt angle, as an absolute value, of from 0 to 10 degrees. The belt cover 143 is disposed in a layered manner outward of the cross belts 141, 142 in the tire radial direction.

The tread rubber 15 is disposed outward of the carcass layer 13 and the belt layer 14 in the tire radial direction and constitutes a tread portion. The pair of sidewall rubbers 16, 16 are disposed outward of the carcass layer 13 in the tire lateral direction and constitute left and right sidewall portions. The pair of rim cushion rubbers 17, 17 are disposed inward of the left and right bead cores 11, 11 and the turned back portions of the carcass layer 13 in the tire radial direction. The pair of rim cushion rubbers 17, 17 constitute the contact surfaces of the left and right bead portions with the rim flanges.

Tread Pattern

Figure 2:
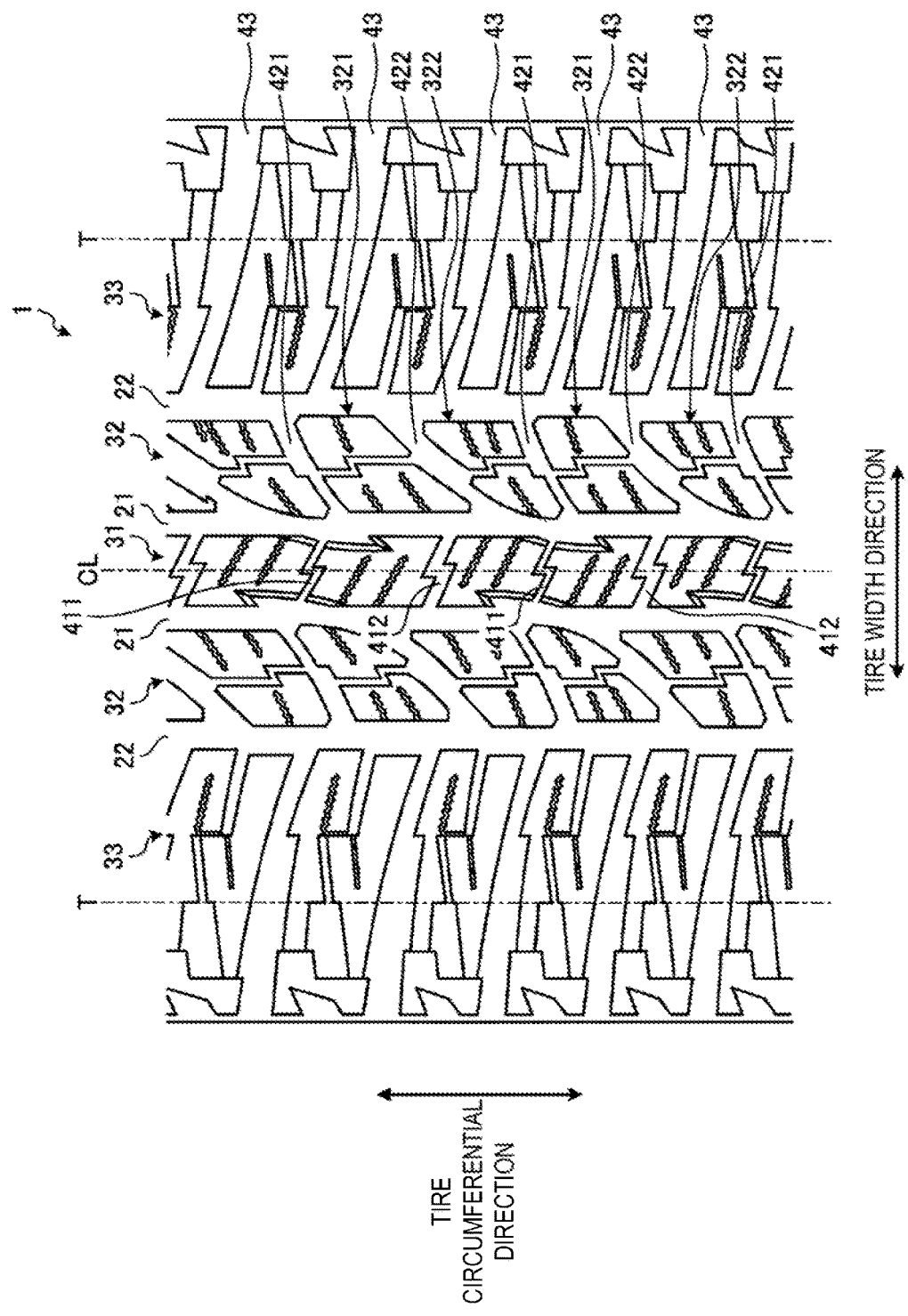
FIG. 2 is a plan view illustrating a tread portion of the pneumatic tire illustrated in FIG. 1.

FIG. 2 is a plan view illustrating a tread pattern of the pneumatic tire illustrated in FIG. 1. The same drawing illustrates a tread pattern for an all-season tire. In reference to the same drawing, "tire circumferential direction" refers to the direction revolving about the tire rotation axis. Reference sign T denotes a tire ground contact edge.

As illustrated in FIG. 2, the pneumatic tire 1 is provided with, in the tread portion, a plurality of circumferential main grooves 21, 22 extending in the tire circumferential direction, a plurality of land portions 31 to 33 defined by the circumferential main grooves 21, 22, and a plurality of lug grooves 411, 412, 421, 422, 43 disposed in the land portions 31 to 33.

"Circumferential main groove" refers to a circumferential groove with a wear indicator that indicates the terminal stage of wear and typically has a groove width of 5.0 mm or greater and a groove depth of 7.5 mm or greater. Moreover, "lug groove" refers to a lateral groove having a groove width of 2.0 mm or greater and a groove depth of 3.0 mm or greater. Additionally, "sipe", which is described below, refers to a cut formed in a land portion that typically has a sipe width of less than 1.5 mm.

The groove width is the maximum distance between the left and right groove walls at the groove opening portion and is measured when the tire is mounted on a specified rim, inflated to the specified internal pressure, and in an unloaded state. In configurations in which the land portions include notch portions or chamfered portions on the edge portions thereof, the groove width is measured with reference to the points where the tread contact patch and extension lines of the groove walls meet, when viewed in a cross-section normal to the groove length direction. Additionally, in configuration in which the grooves extend in a zigzag-like or wave-like manner in the tire circumferential direction, the groove width is measured with reference to the center line of the lateral variation of the groove walls.

The groove depth is the maximum distance from the tread contact patch to the groove bottom and is measured when the tire is mounted on a specified rim, inflated to the specified internal pressure, and in an unloaded state. Additionally, in configurations in which the grooves include an uneven portion or sipes on the groove bottom, the groove depth is measured excluding these portions.

"Specified rim" refers to an "applicable rim" as defined by the Japan Automobile Tyre Manufacturers Association Inc. (JATMA), a "Design Rim" as defined by the Tire and Rim Association, Inc. (TRA), or a "Measuring Rim" as defined by the European Tyre and Rim Technical Organisation (ETRTO). Additionally, "specified internal pressure" refers to a "maximum air pressure" as defined by JATMA, the maximum value in "TIRE LOAD LIMITS AT VARIOUS COLD INFLATION PRESSURES" as defined by TRA, and to "INFLATION PRESSURES" as defined by ETRTO. Additionally, "specified load" refers to a "maximum load capacity" as defined by JATMA, the maximum value in "TIRE LOAD LIMITS AT VARIOUS COLD INFLATION PRESSURES" as defined by TRA, and a "LOAD CAPACITY" as defined by ETRTO. However, in the case of JATMA, for a passenger vehicle tire, the specified internal pressure is an air pressure of 180 kPa, and the specified load is 88% of the maximum load capacity.

For example, in the configuration of FIG. 2, four circumferential main grooves 21, 22 are disposed having point symmetry about a point on the tire equatorial plane CL. Additionally, five land portions 31 to 33 are defined by the four circumferential main grooves 21, 22. One of the land portions 31 is disposed on the tire equatorial plane CL.

However, the configuration is not limited to such and five or more circumferential main grooves may be disposed (not illustrated). The circumferential main grooves 21, 22 may be disposed having left-right asymmetry on either side of the tire equatorial plane CL (not illustrated). Additionally, a circumferential main groove may be disposed on the tire equatorial plane CL (not illustrated). Accordingly, the land portion 31 may be disposed spaced away from the tire equatorial plane CL.

Additionally, in the configuration of FIG. 2, the four circumferential main grooves 21, 22 have an overall straight shape, and the edge portions of the left and right land portions 31 to 33 project toward the circumferential main grooves 21, 22 giving the groove walls of the circumferential main grooves 21, 22 a step-like shape in the tire circumferential direction.

However, the present technology is not limited to such a configuration, and the circumferential main grooves 21, 22 may have a simple straight shape, or a zigzag shape or a wave-like shape that bends or curves while extending in the tire circumferential direction (not illustrated).

Here, the left and right circumferential main grooves 22, 22 located outermost in the tire width direction are referred to as outermost circumferential main grooves. Additionally, the left and right outermost circumferential main grooves 22, 22 define the tread portion center region and the tread portion shoulder regions.

Moreover, the left and right land portions 33, 33 located outward in the tire width direction that are defined by the left and right outermost circumferential main grooves 22, 22 are referred to as shoulder land portions. The left and right shoulder land portions 33, 33 are disposed on left and right tire ground contact edges T, T. Moreover, the left and right land portions 32, 32 located inward in the tire width direction that are defined by the left and right outermost circumferential main grooves 22, 22 are referred to as second land portions. Accordingly, the second land portions 32 are located adjacent to the outermost circumferential main grooves 22. Furthermore, the land portion 31 located inward in the tire width direction of the left and right second land portions 32, 32 is referred to as a "central land portion". In the configuration of FIG. 2, only one center land portion 31 is disposed. However, in configurations with five or more circumferential main grooves, a plurality of center land portions 31 may be disposed.

In the configuration of FIG. 2, the land portions 31 to 33 include the plurality of lug grooves 411, 412, 421, 422, 43 that extend in the tire width direction. The lug grooves 411, 412, 421, 422, 43 have an open structure with the lug grooves 411, 412, 421, 422, 43 passing completely through the land portions 31 to 33 in the tire width direction, and the lug grooves 411, 412, 421, 422, 43 are arranged at predetermined intervals in the tire circumferential direction. Thus, the land portions 31 to 33 are divided into a plurality of blocks in the tire circumferential direction by the lug grooves 411, 412, 421, 422, 43 forming rows of blocks.

However, no such limitation is intended, and for example, a semi-closed structure may be employed in which the lug grooves 411, 412 of the center land portion 31 or the lug grooves 43 of the shoulder land portions 33 terminate at one end portion within the land portions 31, 33 (not illustrated). In such configurations, the land portions 31 to 33 are formed as ribs continuous in the tire circumferential direction.

Center Land Portion and Second Land Portions

Figure 3:
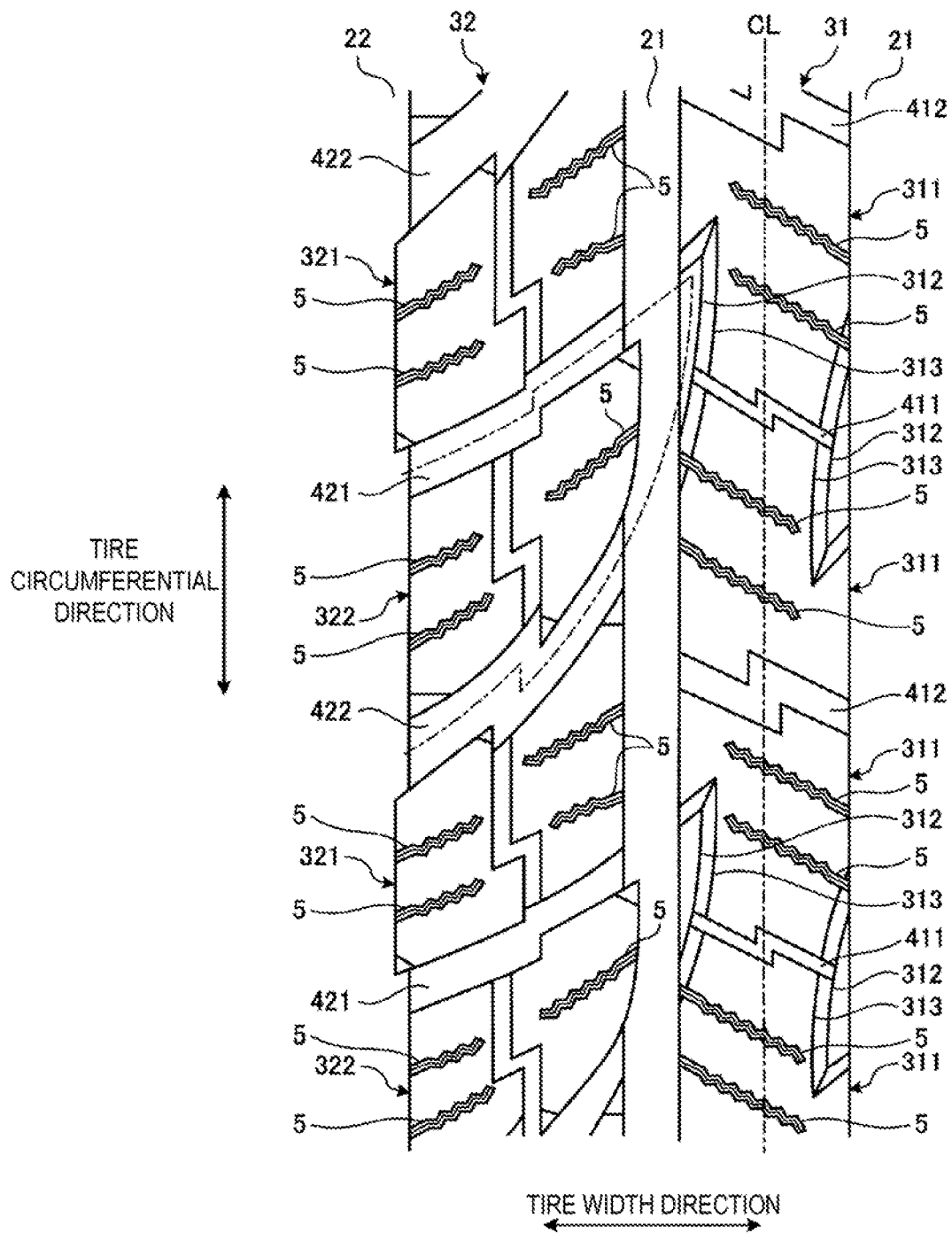
FIG. 3 is an explanatory diagram illustrating a main portion of the tread pattern illustrated in FIG. 2.

FIG. 3 is an explanatory diagram illustrating a main portion of the tread pattern illustrated in FIG. 2. The same drawing is an enlarged plan view of the center land portion 31 and one of the second land portions 32.

In the configuration of FIG. 3, the center land portion 31 is provided with the plurality of lug grooves 411, 412 and a plurality of blocks 311.

The lug grooves 411, 412 are categorized into first lug grooves 411 and second lug grooves 412 which have a greater width than the first lug grooves 411. Specifically, groove width Wg1 of the first lug grooves 411 (see FIG. 4) and groove width Wg2 of the second lug grooves 412 (see FIG. 4) have the relationship Wg1<Wg2. Additionally, the groove width Wg1 of the first lug grooves 411 and the groove width Wg2 of the second lug grooves 412 preferably have the relationship 1.0 mm≤Wg2−Wg1≤4.0 mm and more preferably have the relationship 1.5 mm≤Wg2−Wg1≤3.5 mm. The first lug grooves 411 and the second lug grooves 412 include a bent portion with a Z-shape or a crank-like shape and pass through the center land portion 31 in the tire width direction opening to the left and right circumferential main grooves 21, 21 of the center land portion 31. Additionally, the narrower first lug grooves 411 and the wider second lug grooves 412 are alternately disposed in the tire circumferential direction at predetermined intervals. This reduces pattern noise when the tire rolls.

The groove width Wg2 of the wider second lug grooves 412 may be suitably selected depending on the tire size. For a typical all-season tire for a passenger vehicle, the groove width Wg2 of the second lug grooves 412 is in the range 3.8 mm≤Wg2≤5.3 mm.

The blocks 311 are defined by the first lug grooves 411 and second lug grooves 412 adjacent in the tire circumferential direction and the left and right circumferential main grooves 21, 21 of the center land portion 31. Additionally, the plurality of blocks 311 are disposed in a single row in the tire circumferential direction to form a row of blocks.

In the configuration of FIG. 3, the second land portion 32 is provided with the plurality of lug grooves 421, 422 and a plurality of blocks 321, 322. The lug grooves 421, 422 pass completely through the second land portion 32 in the tire width direction and open to the left and right circumferential main grooves 21, 22 of the second land portion 32. Additionally, the lug grooves 421, 422 are disposed at predetermined intervals in the tire circumferential direction. The two types of lug grooves 421, 422 have different inclination angles, groove shape, and groove width and are alternately disposed in the tire circumferential direction. The blocks 321, 322 are defined by the lug grooves 421, 422 adjacent in the tire circumferential direction. The two types of blocks 321, 322 have different shapes and are disposed in a single row in the tire circumferential direction to form a row of blocks.

Note that as described above, in the configuration of FIG. 3, the lug grooves 411, 412 of the center land portion 31 and the lug grooves 421, 422 of the second land portion 32 have a Z-shape or a crank-like shape in which the groove center line is offset in the tire circumferential direction. Such a configuration is preferable because the edge portion components of the land portions 31, 32 are increased, thus improving the performance on snow of the tire.

However, no such limitation is intended, and the lug grooves 411, 412 of the center land portion 31 and the lug grooves 421, 422 of the second land portion 32 may have a straight shape without a bent portion or have an arc shape (not illustrated).

Notch Portion of Center Land Portion

As illustrated in FIG. 3, in the pneumatic tire 1, the center land portion 31 is provided with a plurality of notch portions 312. The notch portions 312 are formed where the narrower first lug grooves 411 open to the circumferential main groove 21 and increase the width of these opening portions of the first lug grooves 411 in the tire circumferential direction. This ensures the drainage properties and the snow discharge properties of the narrower first lug grooves 411. Additionally, the notch portions 312 compensate for the groove volume of the narrower lug grooves 411, making the rigidity of the land portions in the tire circumferential direction uniform.

The notch portions 312 refer to portions formed on the edge portions of the land portion 31 with a predetermined depth D2 (see FIG. 5 described below). The notch portions 312 are designed to increase the groove volume of the lug grooves 411, and thus the depth D2 is greater than the depth of chamfered portions 313 of the notch portions 312 described below and chamfered portions formed on the edge portions of the land portion 31 (not illustrated). The depth D2 of the notch portions 312 is described below.

A chamfered portion refers to a portion where the edge portion of adjacent surfaces join that is chamfered (for example, corner chamfer) or radiused (round chamfer).

The notch portions 312 are not formed where the wider second lug grooves 412 open to the circumferential main groove 21. In other words, the wider second lug grooves 412 do not communicate with the notch portions 312 and opens at the edge portion of the center land portion 31. Also, the opening portions of the wider second lug grooves 412 and the notch portions 312 may be offset from one another in the tire circumferential direction at the edge portions of the center land portion 31. Accordingly, the opening portions of the second lug grooves 412 are not provided with an increased width by the notch portions 312.

For example, in the configuration of FIG. 3, the notch portions 312 have a V-shaped (or an L-shaped) edge portion when the tread portion is seen in plan view. Additionally, the notch portions 312 are formed on the edge portions of the center land portion 31 on the circumferential main grooves 21 side and the V-shape projects in the tire circumferential direction and in the direction inward in the width direction of the land portion 31. The notch portions 312 with the V-shape each intersect with an opening portion of one of the lug grooves 411. In other words, the lug grooves 411 communicate with the notch portions 312 and open to the circumferential main groove 21 through the notch portions 312. As a result, the notch portion 312 increases the width of the opening portion of the lug groove 411 to the left and the right along the circumferential main groove 21.

The notch portions 312 are formed on the left and right edge portions of the center land portion 31. Additionally, the narrower first lug grooves 411 with the notch portions 312 at the left and right opening portions and the wider second lug grooves 412 without the notch portions at either opening portion are alternately disposed in the tire circumferential direction. The second lug grooves 412 without the notch portions 312 are disposed spaced apart from the V-shaped notch portions 312 in the tire circumferential direction and open to the circumferential main grooves 21 without communicating with the notch portions 312.

Additionally, as described above, a pair of adjacent lug grooves 421, 422 of the second land portion 32 has different inclination angles. Specifically, a crossing angle between the groove center line of the lug groove 421 and the groove center line of the circumferential main groove 21 ranges from 50 degrees to 75 degrees, and a crossing angle between the groove center line of the lug groove 422 and the groove center line of the circumferential main groove 21 ranges from 15 degrees to 40 degrees. Additionally, by the pair of lug grooves 421, 422 being inclined with the same orientation with respect of the tire circumferential direction, the extension lines of the groove center lines of the lug grooves 421, 422 meet at the edge portion of the center land portion 31. The notch portions 312 of the center land portion 31 surround the extension lines of the groove center lines of the lug grooves 421, 422.

Note that in the configuration of FIG. 3, the notch portions 312, 312 are provided at the opening portions of the narrower first lug grooves 411 to the left and right circumferential main grooves 21, 21. However, no such limitation is intended, and the first lug grooves 411 may be provided with the notch portion 312 at only one opening portion and open to the circumferential main groove 21 at the other opening portion without communicating with the notch portion 312 (not illustrated).

Additionally, in the configuration of FIG. 3, as described above, the notch portions 312 each intersect with an opening portion of one of the narrower first lug grooves 411. Thus, the opening portion of the first lug groove 411 is increased in width to the left and the right in the tire circumferential direction. However, no such limitation is intended, and the notch portions 312 may be formed on only one side of the opening portion of the first lug groove 411 and only increase the width of the opening portion of the first lug groove 411 in one direction (not illustrated).

Additionally, in the configuration of FIG. 3, the wider second lug grooves 412 without the notch portion 312 open to the circumferential main groove 21 with a fixed groove width. Such a configuration is preferable because the rigidity of the land portion 31 can be ensured and the steering stability performance of the tire improved to a greater degree than in a configuration in which the notch portions 312 are provided on the opening portions of all of the lug grooves 411, 412 of the center land portion 31 (not illustrated).

However, no such limitation is intended, and the wider second lug grooves 412 may have a chamfered portion where the left and right corner portions of the opening portions are chamfered (not illustrated). Such a chamfered portion may have a smaller width and a smaller depth than the notch portions 312 in a similar manner to the chamfered portions 313 of the notch portions 312 described below. Specifically, the width and the depth of the chamfered portion preferably ranges from 1.5 mm to 6.0 mm. Such chamfered portions 313 increase the wear resistance of the center land portion 31.

Figure 4:
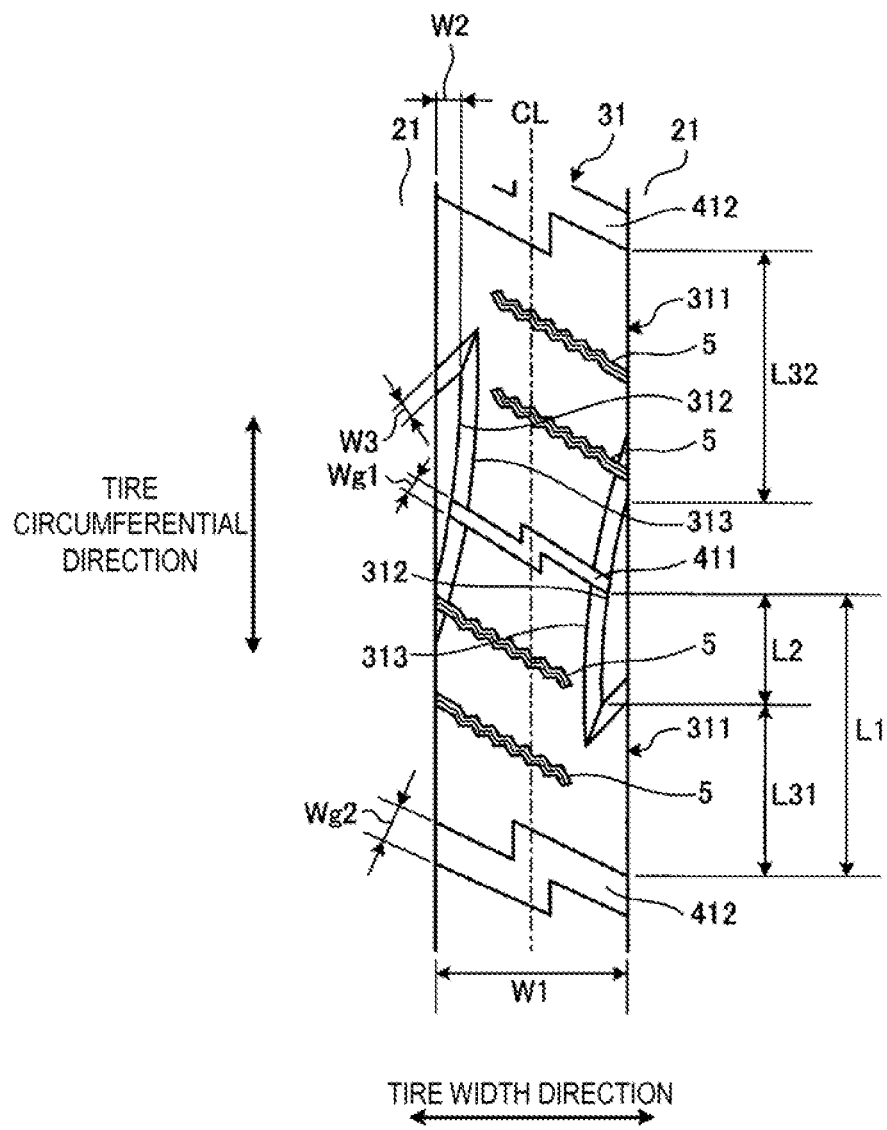
FIG. 4 is an explanatory diagram illustrating a center land portion illustrated in FIG. 3.
Figure 5:
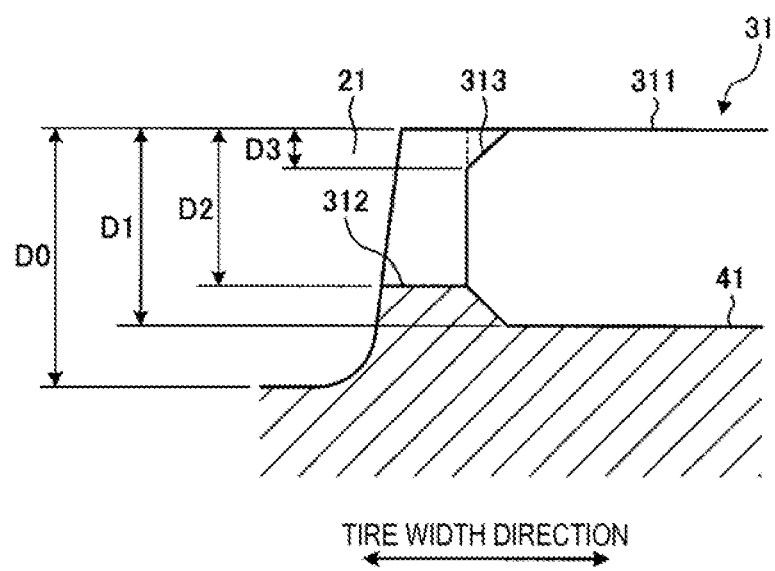
FIG. 5 is an explanatory diagram illustrating the center land portion illustrated in FIG. 3.

FIGS. 4 and 5 are explanatory diagrams illustrating the center land portion illustrated in FIG. 3. FIG. 4 is an enlarged plan view of the center land portion 31. FIG. 5 is a cross-sectional view of the center land portion 31 taken along the lug groove 411.

In FIG. 4, a maximum width W1 of the center land portion 31 and a maximum width W2 of the notch portion 312 preferably have the relationship $0.05 \leq W2/W1 \leq 0.25$, and more preferably have the relationship $0.10 \leq W2/W1 \leq 0.15$. By this, the maximum width W2 of the notch portion 312 is appropriately set.

The maximum width of the land portion is the maximum value of the width in the tire axial direction of the road contact surface of the land portion, and is measured when the tire is mounted on a specified rim, inflated to the specified internal pressure, and in an unloaded state.

The maximum width of the notch portion is the maximum value of the width in the tire axial direction of the notch portion, and is measured when the tire is mounted on a specified rim, inflated to the specified internal pressure, and in an unloaded state using the position where the maximum width of the land portion is measured as the standard.

Additionally, a circumferential length L1 of the edge portion of the center land portion 31 defined by adjacent lug grooves 411, 412 and a circumferential length L2 of the notch portion 312 formed on the edge portion preferably have the relationship $0.30 \leq L2/L1 \leq 0.80$, and more preferably have the relationship $0.45 \leq L2/L1 \leq 0.60$. By this, the circumferential length L2 of the notch portion 312 is appropriately set.

The circumferential length of the edge portion of the land portion is the length in the tire circumferential direction of the edge portion of the land portion between a pair of lug grooves adjacent in the tire circumferential direction that open to the same circumferential main groove, and is measured when the tire is mounted on a specified rim, inflated to the specified internal pressure, and in an unloaded state. For example, in the configuration of FIG. 4, the center land portion 31 is a row of blocks that are defined by the lug grooves 411, 412, and the circumferential length L1 of the edge portion of the center land portion 31 is the length in the tire circumferential direction of the edge portion of one of the blocks 311 on the circumferential main groove 21 side.

The circumferential length of the notch portion is the length in the tire circumferential direction of the notch portion along the edge portion of the land portion defined by adjacent lug grooves, and is measured when the tire is mounted on a specified rim, inflated to the specified internal pressure, and in an unloaded state. For example, in the configuration of FIG. 4, the circumferential length L2 of the notch portion 312 is the length in the tire circumferential direction of the notch portion 312 formed along the edge portion of one of the blocks 311 of the center land portion 31.

Additionally, referring to FIG. 5, a maximum groove depth D1 of the first lug grooves 411 and a maximum depth D2 of the notch portions 312 preferably have the relationship $0.30 \leq D2/D1 \leq 1.00$, and more preferably have the relationship $0.50 \leq D2/D1 \leq 0.80$. By this, the maximum depth D2 of the notch portion 312 is appropriately set.

The maximum groove depth of the lug groove is the maximum distance from the tread contact surface to the groove bottom, and is measured when the tire is mounted on a specified rim, inflated to the specified internal pressure, and in an unloaded state. Additionally, in configurations in which the lug grooves partially include a raised bottom portion or a sipe on the bottom portion, the depth is measured excluding these portions.

The maximum depth D2 of the notch portion is the maximum distance from the tread contact surface to the bottom portion, and is measured when the tire is mounted on a specified rim, inflated to the specified internal pressure, and in an unloaded state. Additionally, in configurations in which the notch portions include a raised bottom portion or a sipe on the groove bottom, the groove depth is measured excluding these portions.

Additionally, referring to FIG. 5, a maximum groove depth D0 of the circumferential main groove 21 and the maximum groove depth D1 of the lug grooves 41 of the center land portion 31 preferably have the relationship $0.6 \leq D1/D0 \leq 0.8$. By this, the groove depth D1 of the lug grooves 41 is appropriately set, and the drainage properties of the lug grooves 411 (412) are ensured.

For example, in the configuration of FIG. 5, the groove depth D0 of the circumferential main groove 21, the groove depth D1 of the lug groove 411, and the maximum depth D2 of the notch portion 312 have the relationship D2<D1<D0. By this, the opening portion of the lug groove 41 to the circumferential main groove 21 is given a raised bottom via the notch portion 312. As a result, the rigidity of the center land portion 31 where the notch portion 312 is formed is ensured. Additionally, the groove bottom of the lug groove 411 and the bottom portion of the notch portion 312 are connected via a gentle inclined portion. This ensures the drainage properties from the lug groove 411 to the circumferential main groove 21.

Additionally, in the configuration of FIGS. 4 and 5, a groove volume V1 of the narrower first lug groove 411 and a volume Vc of the notch portion 312 and a groove volume V2 of the wider second lug groove 412 preferably have the relationship $0.70 \leq (V1+Vc)/V2 \leq 1.30$, and more preferably have the relationship $0.85 \leq (V1+Vc)/V2 \leq 1.15$. By this, the groove volume V1+Vc associated with the first lug groove 411 and the groove volume V2 of the second lug groove 412 can be made uniform.

Figure 6:
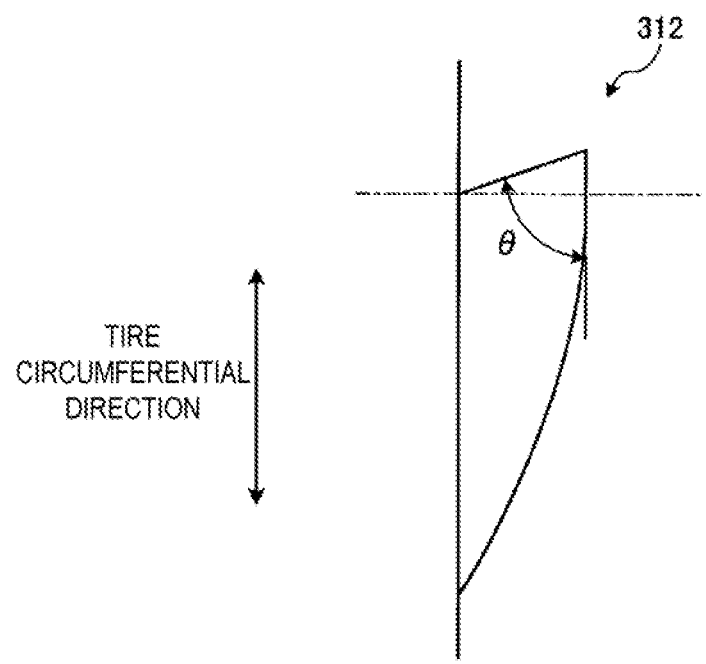
FIG. 6 is an explanatory diagram illustrating a notch portion illustrated in FIG. 4.
Figure 7:
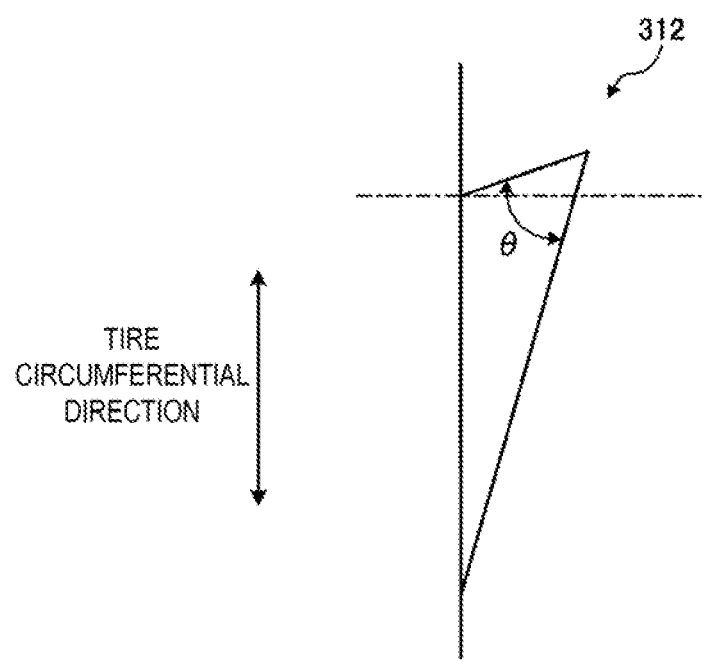
FIG. 7 is an explanatory diagram illustrating a modified example of the notch portion illustrated in FIG. 4.

FIG. 6 is an explanatory diagram illustrating the notch portion illustrated in FIG. 4. FIG. 7 is an explanatory diagram illustrating a modified example of the notch portion illustrated in FIG. 4. These drawings illustrate the edge portion of the center land portion 31 and the profile line of the notch portion 312 when the tread is seen in plan view.

In the configuration of FIG. 4, the notch portion 312 has a V-shape projecting in the tire circumferential direction when the tread is seen in plan view. Additionally, as illustrated in FIG. 6, the two sides of the V-shape of the notch portion 312 include a shorter straight line located on the projecting side of the V-shape and a longer arc on the other side. The two sides are inclined with the same orientation with respect to the tire circumferential direction. A bend angle θ of the V-shape of the notch portion 312 is preferably in the range 10 degrees $\leq \theta \leq 70$ degrees, more preferably in the range 15 degrees $\leq \theta \leq 55$ degrees, and even more preferably in the range 20 degrees $\leq \theta \leq 43$ degrees. By the notch portion 312 having a V-shape with such an acute angle projecting in the tire circumferential direction, as illustrated in FIG. 3, the notch portions 312 can surround where the extension lines of the groove center lines of the lug grooves 421, 422 of the second land portion 32 meet.

The bend angle θ of the notch portion 312 is measured using the profile line of the wall surface of the notch portion 312 when the tread is seen in plan view, and is measured when the tire is mounted on a specified rim, inflated to the specified internal pressure, and in an unloaded state. Additionally, as illustrated in FIG. 6, in configurations in which the notch portion 312 includes a side which is curved, the bend angle θ is measured using the tangent line of the curved side at the vertex of the V-shape as the standard. Note that the bend angle θ can be suitably set in relation to the pitch length of a tread pattern with pitch variation.

However, no such limitation is intended, and the two sides of the V-shape of the notch portion 312 may both be straight lines (see FIG. 7), or may both be arcs (not illustrated). Additionally, the notch portion 312 may have a shape such as a circular, elliptical, triangular, rectangular, or trapezoidal shape (not illustrated).

Chamfered Portion of Notch Portion

As illustrated in FIGS. 4 and 5, the center land portion 31 is provided with the chamfered portion 313. The chamfered portion 313 is formed along the edge portion of the notch portion 312. This improves the wear resistance of the edge portion of the center land portion 31.

For example, in the configuration of FIG. 4, the chamfered portion 313 is formed along the entire region of the edge portion of the V-shaped notch portion 312. Additionally, the chamfered portion 313 is formed on all of the notch portions 312 of the center land portion 31.

The maximum width W2 of the notch portion 312 and a width W3 of the chamfered portion 313 preferably have the relationship $0.30 \leq W3/W2 \leq 1.80$, and more preferably have the relationship $0.80 \leq W3/W2 \leq 1.20$. Additionally, the width W3 of the chamfered portion 313 is preferably in the range 1.5 mm $\leq W3 \leq 6.0$ mm. By this, the width W3 of the chamfered portion 313 is appropriately set.

The width W3 of the chamfered portion is the distance between the profile line of the notch portion and the tread contact surface when the tread is seen in plan view, and is measured when the tire is mounted on a specified rim, inflated to the specified internal pressure, and in an unloaded state (see FIG. 4).

Additionally, as illustrated in FIG. 5, a depth D3 of the chamfered portion 313 and the maximum depth D2 of the notch portion 312 preferably have the relationship $0.50 \leq D3/D2 \leq 0.80$. The depth D3 of the chamfered portion 313 is preferably in the range 1.3 mm $\leq D3 \leq 5.5$ mm. By this, the depth D3 of the chamfered portion 313 is appropriately set.

The depth D3 of the chamfered portion is the distance from the tread contact surface to the deepest position of the chamfered portion, and is measured when the tire is mounted on a specified rim, inflated to the specified internal pressure, and in an unloaded state. As illustrated in FIG. 5, the boundary between the notch portion and the chamfered portion is defined by the point where the extension line of the wall surface of the notch portion 312 on the bottom portion side and inclined surface of the chamfered portion 313 that connects to the road contact surface of the land portion 31 meet.

Note that in the configuration of FIG. 5, the chamfered portion 313 has a corner chamfer, but no such limitation is intended. The chamfered portion 313 may have a round chamfer (not illustrated).

Sipes of Land Portions

As illustrated in FIG. 3, the center land portion 31 and the second land portions 32 are provided with a plurality of sipes 5. The sipes 5 are categorized into two-dimensional sipes (flat sipes) and three-dimensional sipes (cubic sipes). The sipes 5 ensure the edge components in the land portions 31, 32. As a result, the traction characteristics of the tire is improved.

The two-dimensional sipes have a sipe wall surface with a straight shape as viewed in a cross-section taken along the normal line direction of the sipe length direction (a cross-section showing the sipe width direction and the sipe depth direction). The two-dimensional sipes are only required to have a straight shape when viewed in the cross-section described above and may extend in the sipe length direction with a straight shape, a zigzag shape, a wave-like shape, or an arc shape.

The three-dimensional sipes have a sipe wall surface with a bent shape having lateral variation in the sipe width direction as viewed in a cross-section taken along the normal line direction of the sipe length direction and a cross-section taken along the normal line direction of the sipe depth direction. Compared to the two-dimensional sipes, the three-dimensional sipes have a greater meshing force between opposing sipe wall surfaces and therefore act to reinforce the rigidity of the land portions. The three-dimensional sipes are only required to have the structure described above at the sipe wall surface and may have a straight shape, a zigzag shape, a wave-like shape, or an arc shape at the tread contact surface. The following are examples of such three-dimensional sipes (see FIGS. 8 and 9).

Figure 8:
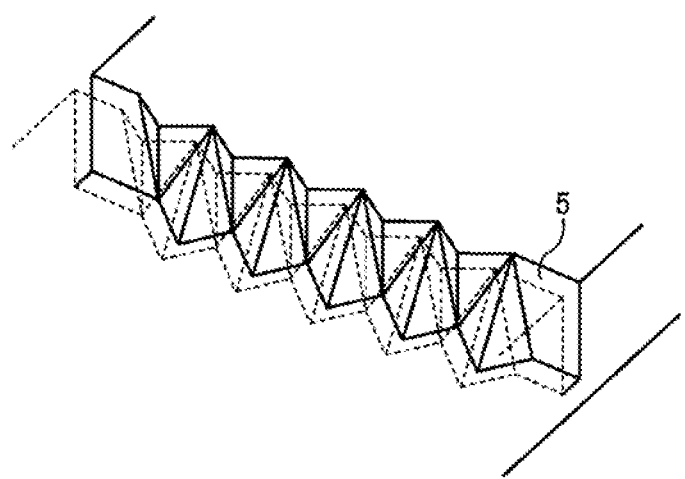
FIG. 8 is an explanatory diagram illustrating an example of a three-dimensional sipe.
Figure 9:
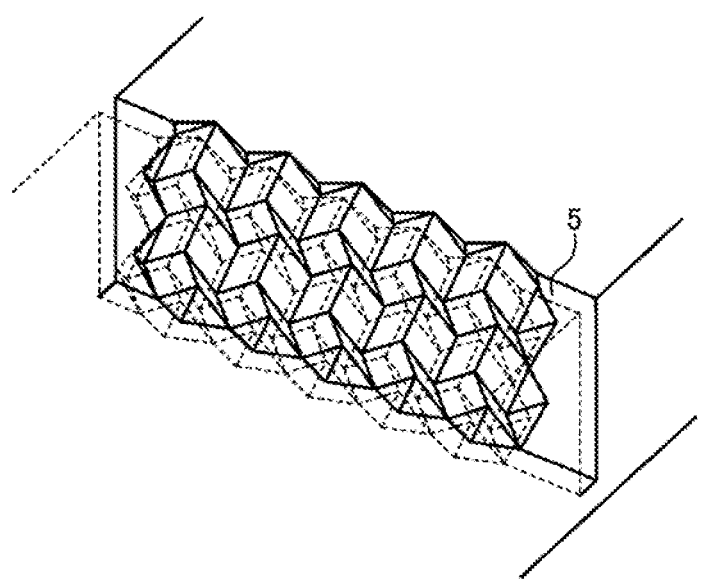
FIG. 9 is an explanatory diagram illustrating an example of a three-dimensional sipe.

FIGS. 8 and 9 are explanatory diagrams illustrating examples of the three-dimensional sipes. These drawings are perspective views of the three-dimensional sipes with a pyramid shaped sipe wall surface.

In the configuration of FIG. 8, the sipe wall surface has a structure in which pyramids and inverted pyramids are connected in the sipe length direction. In other words, the sipe wall surface is formed by mutually offsetting in the tire lateral direction the pitches of a zigzag shape located proximal to the tread surface and a zigzag shape located on the bottom portion side so that mutually opposing recesses and protrusions are formed by the zigzag shapes on the tread surface side and the bottom side. Additionally, in the recesses and protrusions, when viewed in a tire rotating direction, the sipe wall surface is formed by connecting a protrusion inflection point on the tread surface side to a recess inflection point on the bottom side, a recess inflection point on the tread surface side to a protrusion inflection point on the bottom side, and protrusion inflection points mutually adjacent to the protrusion inflection point on the tread surface side and the protrusion inflection point on the bottom side with ridge lines; and connecting these ridge lines with consecutive planes in the tire width direction. Additionally, a first sipe wall surface has an uneven surface with convex pyramids and inverted pyramids arranged alternating in the tire lateral direction; and a second sipe wall surface has an uneven surface with concave pyramids and inverted pyramids arranged alternating in the tire lateral direction. Furthermore, the uneven surface of the sipe wall surface is oriented toward outside the blocks at at least the outer ends of the sipe. Note that examples of such a three-dimensional sipe include the technology described in Japanese Patent No. 3894743.

In the configuration of FIG. 9, the sipe wall surface has a structure in which a plurality of prism shapes having a block shape are connected in the sipe depth direction and the sipe length direction while inclining with respect to the sipe depth direction. In other words, the sipe wall surface has a zigzag shape at the tread surface. Additionally, the sipe wall surface has bent portions in at least two locations in the tire radial direction in the blocks that bend in the tire circumferential direction and are connected in the tire lateral direction. Moreover, these bent portions have a zigzag shape with lateral variation in the tire radial direction. Additionally, while, in the sipe wall surface, the lateral variation is constant in the tire circumferential direction, an inclination angle in the tire circumferential direction with respect to a normal line direction of the tread surface is smaller at a portion on the sipe bottom side than at a portion on the tread surface side; and the lateral variation in the tire radial direction of the bent portion is greater at a portion on the sipe bottom side than at a portion on the tread surface side. Note that examples of such a three-dimensional sipe include the technology described in Japanese Patent No. 4316452.

For example, in the configuration of FIG. 4, the blocks 311 of the center land portion 31 each include the plurality of sipes 5 with each of the sipes 5 being a three-dimensional sipe. Additionally, the sipe 5 terminates within the block 311 at one end portion and communicates with the circumferential main groove 21 at the other end opening at the edge portion of the block 311. The sipes 5 are inclined with the same orientation as the lug grooves 41 with respect to the tire circumferential direction and extend in the tire width direction crossing the center line of the center land portion 31 (the tire equatorial plane CL in FIG. 4). The sipes 5 and the lug grooves 41 are disposed at equal intervals in the tire circumferential direction, thus defining the blocks 311 into rectangular regions with substantially equal widths. Additionally, in the blocks 311, 311 adjacent in the tire circumferential direction, the sipes 5 are inclined with the same orientation with respect to the tire circumferential direction and open at the edge portion on different sides.

The sipes 5 each open at the edge portion of the blocks 311 without communicating with the notch portions 312. Accordingly, the opening portion of the sipe 5 and the notch portion 312 are disposed offset from one another in the tire circumferential direction at the edge portion of the block 311. At the edge portion of the block 311, a distance g1 (dimension reference sign omitted from drawings) between the opening portion of the sipe 5 and the notch portion 312 is preferably in the range $2.0$ mm$\leq$g1. This ensures that the distance g1 between the opening portion of the sipe 5 and the notch portion 312 is appropriate.

Additionally, at least one of the sipes 5 pass completely through the chamfered portion 313 of the notch portion 312 and opens at the edge portion of the block 311. Specifically, as illustrated in FIG. 4, the notch portion 312 and the chamfered portion 313 have a V-shape projecting in the tire circumferential direction and extend beyond the lug groove 41 across two of the blocks 311, 311. In the block 311 with the V-shaped notch portion 312 and chamfered portion 313, all of the sipes 5 are disposed spaced apart from the notch portion 312 and the chamfered portion 313. In the other block 311, at least one of the sipes 5 passes completely through the chamfered portion 313 and opens at the edge portion of the block 311.

Additionally, as described above, the terminating end portion of the sipes 5 within the blocks 311 are disposed spaced apart from the notch portion 312 and the chamfered portion 313. In such a configuration, the road contact surface of the blocks 311 is not divided by the sipes 5, the notch portion 312, or the chamfered portion 313 and extends continuously in the tire circumferential direction. This ensures the road contact surface of the blocks 311. Additionally, a distance g2 (dimension reference sign omitted from drawings) between the terminating end portion of the sipe 5 and the chamfered portion 313 is preferably in the range $2.0$ mm$\leq$g2. This ensures that the distance g2 between the terminating end portion of the sipe 5 and the chamfered portion 313 is appropriate.

Note that in the configuration of FIG. 4, as described above, at least one of the sipes 5 passes completely through the chamfered portion 313 of the notch portion 312. However, no such limitation is intended, and all of the sipes 5 may be disposed spaced apart from the notch portions 312 and the chamfered portions 313. As a result, the rigidity of the center land portion 31 is ensured.

Effects

As described above, the pneumatic tire 1 includes the plurality of circumferential main grooves 21, 22 and the land portion 31 defined by the circumferential main grooves 21, 21 (see FIG. 2). Additionally, the land portion 31 is provided with the plurality of first lug grooves 411, the plurality of second lug grooves 412 that are wider than the first lug grooves 411, and the plurality of notch portions 312 formed on only the opening portions of the first lug grooves 411 (see FIG. 4).

In such a configuration:

(1) By the narrower first lug grooves 411 and the wider second lug grooves 412 being intermingled in the land portion 31, the pattern noise when the tire rolls is reduced. This is advantageous because the noise performance of the tire is improved. (2) By the notch portions 312 increasing the width of the opening portions of the narrower first lug grooves 411, the drainage properties and the snow discharge properties of the first lug grooves 411 are improved. This is advantageous because the wet performance and the performance on snow of the tire are improved. Additionally, (3) the notch portions 312 compensate for the groove volume of the narrower first lug grooves 411, making the rigidity of the land portion 31 in the tire circumferential direction uniform. This is advantageous because the steering stability performance of the tire is improved.

Additionally, in the pneumatic tire 1, the groove width $Wg1$ of the first lug grooves 411 and the groove width $Wg2$ of the second lug grooves 412 have the relationship $1.0$ mm$\leq Wg2-Wg1 \leq 4.0$ mm (see FIG. 4). This is advantageous because the difference $Wg2-Wg1$ between the groove width $Wg1$ of the narrower first lug grooves 411 and the wider second lug grooves 412 is appropriately set. In other words, by $1.0$ mm$\leq Wg2-Wg1$ being satisfied, the difference $Wg2-Wg1$ between the groove widths of the lug grooves 411, 412 is ensured, and pattern noise when the tire rolls is reduced. Additionally, by $Wg2-Wg1 \leq 4.0$ mm being satisfied, non-uniform rigidity of the land portion 31 caused by the difference $Wg2-Wg1$ between the groove widths of the lug grooves 411, 412 being excessive is alleviated.

Additionally, in the pneumatic tire 1, the groove volume $V1$ of the first lug grooves 411 and the volume $Vc$ of the notch portions 312 and the groove volume $V2$ of the second lug grooves 412 have the relationship $0.70 \leq (V1+Vc)/V2 \leq 1.30$. In such a configuration, the sum $V1+Vc$ of the volume of the narrower first lug grooves 411 and the notch portions 312 and the groove volume $V2$ of the wider second lug grooves 412 is made uniform. This is advantageous because the rigidity of the land portion 31 in the tire circumferential direction is made uniform.

Additionally, in the pneumatic tire 1, the circumferential length $L1$ of the edge portions of the center land portion 31 defined by adjacent first lug grooves 411 and second lug grooves 412 and the circumferential length $L2$ of the notch portions 312 formed on the edge portions have the relationship $0.30 \leq L2/L1 \leq 0.80$ (see FIG. 4). This is advantageous because the circumferential length $L2$ of the notch portions 312 is appropriately set. In other words, by $0.30 \leq L2/L1$ being satisfied, the circumferential length $L2$ of the notch portions 312 is ensured, drainage properties and snow discharge properties of the narrower first lug grooves 411 is improved, and noise properties are improved. By $L2/L1 \leq 0.80$ being satisfied, a decrease in rigidity of the land portion 31 caused by the notch portions 312 being excessively large is suppressed.

Additionally, in the pneumatic tire 1, the maximum width $W1$ of the land portion 31 and the maximum width $W2$ of the notch portions 312 have the relationship $0.05 \leq W2/W1 \leq 0.20$ (see FIG. 4). This is advantageous because the maximum width $W2$ of the notch portions 312 is appropriately set. In other words, by $0.05 \leq W2/W1$ being satisfied, the maximum width $W2$ of the notch portions 312 is ensured, drainage properties and snow discharge properties of the narrower first lug grooves 411 is improved, and noise properties are improved. By $W2/W1 \leq 0.20$ being satisfied, a decrease in rigidity of the land portion 31 caused by the notch portions 312 being excessively large is suppressed.

Additionally, in the pneumatic tire 1, the maximum groove depth $D1$ of the first lug grooves 411 and the maximum depth $D2$ of the notch portions 312 have the relationship $0.30 \leq D2/D1 \leq 1.00$ (see FIG. 5). This is advantageous because the maximum depth $D2$ of the notch portions 312 is appropriately set. In other words, by $0.30 \leq D2/D1$ being satisfied, the maximum depth $D2$ of the notch portions 312 is ensured, drainage properties and snow discharge properties of the first lug grooves 411 is improved, and noise properties are improved. By $D2/D1 \leq 1.00$ being satisfied, a decrease in rigidity of the land portion 31 caused by the notch portions 312 being excessively deep is suppressed.

Additionally, in the pneumatic tire 1, the maximum groove depth $D1$ of the first lug grooves 411 and the maximum depth $D2$ of the notch portions 312 have the relationship $D2/D1 \leq 0.80$ (see FIG. 5). In other words, by the notch portions 312 having the maximum depth $D2$ which is less than the maximum groove depth $D1$ of the first lug grooves 411, the opening portions of the first lug grooves 411 are given a raised bottom. This is advantageous because the rigidity of the land portion 31 is ensured, and the steering stability performance of the tire is improved.

Additionally, in the pneumatic tire 1, the notch portions 312 have an edge portion with a V-shape projecting in the tire circumferential direction (see FIG. 4). This is advantageous because the edge length of the land portion 31 is increased and thus the performance on snow and bad road traveling performance are improved.

Additionally, in the pneumatic tire 1, the bend angle $\theta$ of the V-shape of the notch portions 312 is in the range $10$ degrees$\leq \theta \leq 70$ degrees (see FIG. 6). This is advantageous because the bend angle $\theta$ of the notch portions 312 is appropriately set. In other words, by $10$ degrees$\leq \theta$ being satisfied, the size of the notch portions 312 is ensured, drainage properties and snow discharge properties of the narrower first lug grooves 411 is improved, and noise properties are improved. By $\theta \leq 70$ degrees being satisfied, a decrease in rigidity of the land portion 31 caused by the notch portions 312 being excessively large is suppressed.

Additionally, in the pneumatic tire 1, the notch portions 312 intersect with the opening portion of the first lug grooves 411 (see FIG. 4). In other words, the notch portions 312 are each disposed on either side of one of the first lug grooves 411 across the edge portions of a pair of adjacent land portion 31 portions (the blocks 311, 311). This is advantageous because the opening portion of the narrower first lug grooves 411 is increased in width to the left and the right by the notch portions 312, thus improving the drainage properties of the first lug grooves 411.

Additionally, in the pneumatic tire 1, the land portion 31 is referred to as the first land portion, and the land portions 32 on the other side of the circumferential main groove 21 from the first land portion 31 are referred to as the second land portions (see FIG. 3). The second land portions 32 include pairs of lug grooves 421, 422 inclined at the different inclination angles and the extension lines of the groove center lines of the pairs of lug grooves 421, 422 meet at the edge portion of the first land portion 31. Additionally, the notch portions 312 of the first land portion 31 are formed surrounding the extension lines of the groove center lines of the pair of lug grooves 421, 422. In such a configuration, a water drainage passage is formed from the notch portion 312 of the first land portion 31 to the circumferential main groove 22 located outward of the second land portion 32 in the tire width direction via the lug grooves 421, 422 of the second land portion 32. This is advantageous because the drainage properties of the tread portion center region are improved and the wet performance of the tire is improved.

Additionally, in the pneumatic tire 1, the land portion 31 includes three-dimensional sipes 5 (see FIG. 4). This is advantageous because the edge components of the land portion 31 are increased, thus increasing the performance on snow of the tire. Also, compared to configurations with two-dimensional sipes, the rigidity of the land portion 31 is ensured and the steering stability performance of the tire is maintained.

Additionally, in the pneumatic tire 1, the land portion 31 includes three-dimensional sipes 5 that pass completely through the chamfered portion 313 and open to the circumferential main groove 21 (see FIG. 4). Such a configuration is advantageous because the rigidity of the land portion 31 can be adjusted via the three-dimensional sipes 5, and the rigidity distribution in the tire contact surface can be optimized.

Additionally, in the pneumatic tire 1, the opening portions of the three-dimensional sipes 5 to the circumferential main groove 21 and the notch portions 312 are disposed spaced apart from one another at the edge portion of the land portion 31 (see FIG. 4). This ensures the distance g1 (dimension reference sign omitted from drawings) between the opening portion of the three-dimensional sipe 5 and the notch portion 312 and suppresses cracking originated at the sipes 5.

Additionally, in the pneumatic tire 1, the land portion 31 includes the three-dimensional sipes 5 that terminate within the land portion 31 at one end portion and open at the edge portion of the land portion 31 at the other end portion (see FIG. 4). The terminating end portions of the three-dimensional sipes 5 are disposed spaced apart from the chamfered portions 313. This ensures the distance g2 (dimension reference sign omitted from drawings) between the terminating end portion of the three-dimensional sipe 5 and the chamfered portion 313 and suppresses cracking originated at the sipes 5.

EXAMPLES

FIG. 10 is a table showing results of performance testing of pneumatic tires according to embodiments of the present technology.

In the performance testing, a plurality of different test tires were evaluated for: (1) performance on snow, (2) noise performance, and (3) steering stability performance. The test tires with a tire size of 265/65R17 112H were mounted on a rim with a rim size of 17×8J, inflated to an air pressure of 230 kPa, and loaded the maximum load as defined by JATMA was applied. Then, the test tires were mounted on the wheels of the test vehicle, a four-wheel drive recreational vehicle (RV) with an engine displacement of 3.5 L.

(1) Evaluation of performance on snow: The test vehicle was driven on a snowy road surface of a snowy road test site, and the braking distance from a traveling speed of 40 km/h was measured. Then, the measurement results were expressed as index values with the result of the conventional example being defined as the reference (100). In this evaluation, larger values are preferable.

(2) Evaluation of noise performance: The test vehicle was driven on an International Organization for Standardization (ISO) test course at a speed of 80 km/h, and the sound pressure levels of the pass-by noise (external noise) was measured. Results of the evaluation were expressed as index values with the result of the Conventional Example 1 being defined as the reference (100). In this evaluation, larger values are preferable and indicate low sound pressure levels.

(3) Evaluation of steering stability performance: The test vehicle was driven at a speed of from 60 km/h to 100 km/h on a flat circuit test course with a dry road surface. Then, the test driver performed a sensory evaluation regarding steering while lane changing and cornering and stability while traveling forward. Results of the evaluation were expressed as index values with the result of the Conventional Example 1 being defined as the reference (100). In this evaluation, larger values are preferable.

The test tires of Examples 1 to 11 have the structure illustrated in FIGS. 1 to 5, with the center land portion 31 including the lug grooves 41, the notch portions 312, and the chamfered portions 313. The width W1 of the center land portion 31 is 30.0 mm, the groove depth D0 of the circumferential main groove 21 is 6.0 mm, the groove depth D1 of the first lug grooves 411 and the second lug grooves 412 is 4.0 mm. Additionally, in Examples 1 to 9, the two sides of the V-shape are inclined with different orientations with respect to the tire circumferential direction so that the V-shape of the notch portions 312 does not project in the tire circumferential direction. In Examples 10 and 11, the two sides of the V-shape are inclined with the same orientation with respect to the tire circumferential direction so that the V-shape of the notch portions 312 projects in the tire circumferential direction (see FIG. 4).

The test tires of the Conventional Example and the Comparative Example have the structure illustrated in FIGS. 1 to 5, but the center land portion 31 does not include the notch portions 312 or the chamfered portions 313.

As shown in the test results, it can be seen that the tires of Examples 1 to 11 have good performance on snow, noise performance, and steering stability performance in a compatible manner.

The invention claimed is:
1. A pneumatic tire, comprising:
a plurality of circumferential main grooves; and
a land portion defined by a pair of the plurality of circumferential main grooves;
one of the land portion comprising a plurality of first lug grooves, a plurality of second lug grooves wider than the first lug grooves, and a plurality of notch portions formed only on opening portions of the first lug grooves;
wherein a circumferential length L1 of edge portions of the land portion defined by the first lug grooves and the second lug grooves adjacent to one another and a circumferential length L2 of the notch portions formed on the edge portions have a relationship $0.30 \leq L2/L1 \leq 0.80$.

2. The pneumatic tire according to claim 1, wherein a groove width Wg1 of the first lug grooves and a groove width Wg2 of the second lug grooves have a relationship $1.0 \text{ mm} \leq Wg2-Wg1 \leq 4.0 \text{ mm}$.

3. The pneumatic tire according to claim 1, wherein a groove volume V1 of the first lug grooves and a volume Vc of the notch portions and a groove volume V2 of the second lug grooves have a relationship $0.70 \leq (V1+Vc)/V2 \leq 1.30$.

4. The pneumatic tire according to claim 1, wherein a maximum width W1 of the land portion and a maximum width W2 of the notch portions have a relationship $0.05 \leq W2/W1 \leq 0.20$.

5. The pneumatic tire according to claim 1, wherein a maximum groove depth D1 of the first lug grooves and a maximum depth D2 of the notch portions have a relationship $0.30 \leq D2/D1 \leq 1.00$.

6. The pneumatic tire according to claim 5, wherein the maximum groove depth D1 of the first lug grooves and the maximum depth D2 of the notch portions have a relationship $D2/D1 \leq 0.80$.

7. The pneumatic tire according to claim 1, wherein the notch portions comprise an edge portion with a V-shape projecting in a tire circumferential direction.

8. The pneumatic tire according to claim 7, wherein a bend angle θ of the V-shape of the notch portions is in a range 10 degrees $\leq \theta \leq 70$ degrees.

9. The pneumatic tire according to claim 1, wherein the notch portions are disposed intersecting the opening portions of the first lug grooves.

10. The pneumatic tire according to claim 1, wherein
the land portion is a first land portion and land portions on another side of the circumferential main grooves from the first land portion are second land portions, and
the second land portions each comprise a pair of lug grooves that incline at different inclination angles, and extension lines of groove center lines of the pair of lug grooves meet at an edge portion of the first land portion, and
the notch portions of the first land portion are formed surrounding the extension lines of the groove center lines of the pair of lug grooves.

11. The pneumatic tire according to claim 1, wherein the land portion comprises a three-dimensional sipe.

12. The pneumatic tire according to claim 11, wherein
the land portion comprises a chamfered portion on an edge portion on a circumferential main groove side, and
the three-dimensional sipe passes completely through the chamfered portion and opens to the circumferential main groove.

13. The pneumatic tire according to claim 11, wherein an opening portion of the three-dimensional sipe to the circumferential main groove and the notch portions are disposed spaced apart from one another in a tire circumferential direction at an edge portion of the land portion.

14. The pneumatic tire according to claim 11, wherein
the land portion comprises a chamfered portion on an edge portion on a circumferential main groove side,
the three-dimensional sipe terminates within the land portion at one end portion and opens to the edge portion of the land portion at another end portion, and
the terminating end portion of the three-dimensional sipe and the chamfered portion are disposed spaced apart from one another.

15. The pneumatic tire according to claim 1, wherein the first and second lug grooves include a bent portion with a Z-shape or a crank-like shape and pass through the center land portion in the tire width direction.

16. The pneumatic tire according to claim 1, wherein the first and second lug grooves are alternately disposed in the tire circumferential direction.

17. A pneumatic tire, comprising:
a plurality of circumferential main grooves; and
a land portion defined by a pair of the plurality of circumferential main grooves;
one of the land portion comprising a plurality of first lug grooves, a plurality of second lug grooves wider than the first lug grooves, and a plurality of notch portions formed only on opening portions of the first lug grooves;
wherein the notch portions comprise an edge portion with a V-shape projecting in a tire circumferential direction.

18. A pneumatic tire, comprising:
a plurality of circumferential main grooves extending continuously in a tire circumferential direction;
a first land portion defined by a pair of the plurality of circumferential main grooves; and
second land portions on an other side of the circumferential main grooves from the first land portion;
the first land portion comprising a plurality of first lug grooves, a plurality of second lug grooves wider than the first lug grooves, and a plurality of notch portions formed only on opening portions of the first lug grooves;
the second land portions each comprising a pair of lug grooves that incline at different inclination angles, extension lines of groove center lines of the pair of lug grooves meeting at an edge portion of the first land portion; and
the notch portions of the first land portion being formed surrounding the extension lines of the groove center lines of the pair of lug grooves.

* * * * *